United States Patent
Correll, Jr.

(10) Patent No.: US 8,311,998 B2
(45) Date of Patent: Nov. 13, 2012

(54) SYSTEM AND METHODS FOR FACILITATING A LINEAR GRID DATABASE WITH DATA ORGANIZATION BY DIMENSION

(75) Inventor: Harold Landorff Correll, Jr., Bentonville, AR (US)

(73) Assignee: Wal-Mart Store, Inc., Bentonville, AR (US)

(*) Notice: Subject to any disclaimer, the term of this patent is extended or adjusted under 35 U.S.C. 154(b) by 0 days.

(21) Appl. No.: 12/643,545

(22) Filed: Dec. 21, 2009

(65) Prior Publication Data

US 2010/0100556 A1 Apr. 22, 2010

Related U.S. Application Data

(63) Continuation of application No. 11/100,073, filed on Apr. 5, 2005, now Pat. No. 7,672,930.

(51) Int. Cl.
*G06F 7/00* (2006.01)
*G06F 17/00* (2006.01)

(52) U.S. Cl. .......... 707/706; 707/758; 707/713
(58) Field of Classification Search .......... 707/706, 707/713, 758

See application file for complete search history.

(56) References Cited

U.S. PATENT DOCUMENTS

| | | | |
|---|---|---|---|
| 5,864,857 A * | 1/1999 | Ohata et al. ........................ | 1/1 |
| 6,189,012 B1 * | 2/2001 | Mital et al. ..................... | 717/165 |
| 6,381,605 B1 * | 4/2002 | Kothuri et al. ..................... | 1/1 |
| 6,738,762 B1 * | 5/2004 | Chen et al. ..................... | 707/719 |
| 7,330,857 B1 * | 2/2008 | Svingen et al. ............... | 707/706 |
| 7,337,163 B1 * | 2/2008 | Srinivasan et al. .................... | 1/1 |

OTHER PUBLICATIONS

European Search Report dated Sep. 28,2009 for European Patent Application No. 06740253.7.
Mexican Office Action dated Sep. 29, 2009 for Mexican Patent Application No. MX/a/2007/012403.
Unofficial English translation of Mexican Office Action dated Sep. 29, 2009 for Mexican Patent Application No. MX/a/2007/012403.
Drach et al., "Optimizing Mass Storage Organization and Access for Multi-Dimensional Scientific Data", Mass Storage Systems, 1993. Putting All That Data Work. Proceedings. 12th IEEE Symposium on Mass Storage Systems, Monterey, CA, USA Apr. 26-29, 1993, pp. 215-219.

* cited by examiner

*Primary Examiner* — Giovanna Colan
(74) *Attorney, Agent, or Firm* — Alicia L. W. Brewster, Esq.; Troutman Sanders LLP

(57) ABSTRACT

Systems and methods for retrieving data within a linear grid management system are disclosed. Data having multiple dimensions is associated with physical locations, where a first dimension of the data is associated with a set of nodes and a second dimension of the data is associated with a set of memory storage locations. A received data query can be divided into multiple subqueries or data requests, such that each subquery is directed to a particular node identified by the first dimension of data referenced by the data query. When receiving a subquery, a node generates a unique and efficient parsing process to retrieve data from the memory storage locations identified by the second dimension of data referenced by the data query.

11 Claims, 13 Drawing Sheets

SYSTEM AND METHODS FOR FACILITATING A LINEAR GRID DATABASE WITH DATA ORGANIZATION BY DIMENSION

PRIORITY CLAIM AND CROSS-REFERENCE TO RELATED APPLICATION

This application is a continuation of U.S. patent application Ser. No. 11/100,073, filed 5 Apr. 2005, the contents and substance of which are incorporated herein by reference as if fully set forth below.

TECHNICAL FIELD

The present invention relates, generally, to a linear grid database, and, more particularly, to a linear grid database which organizes data by dimension.

BACKGROUND

Collecting, sorting, and reporting large volumes of data have become increasingly important as valuable data continues to grow at significant rates. Originally, businesses and government agencies hired individuals to manage large collections of data, which included storing and indexing files in large record centers. As the cost of managing the physical files increased, investing in a less expensive, more efficient mechanical solution became more worthwhile.

After the introduction of the computer, a number of advanced techniques emerged to provide automated data management. Database models were developed allowing information to be conceptualized, structured, and manipulated without hardware-specific dependency limitations. Navigational, hierarchical, network and relational database models provided rapid access to large amounts of data through the use of computer applications. Such database models often use techniques such as data mining, data warehousing, and data marts for effective data management. The relational database model has become the most prevalent database model in use today, because it provides data independence from hardware and store implementation, while providing an automatic navigation (or a high level, nonprocedural language) for accessing data.

Since the introduction of databases, the size of databases has grown from a few megabytes of data for applications just a few years ago to several terabytes of data for today's applications, such as mailing lists, customer information for retail businesses, and the like. As the amount of data increases, the cost of storage space and data management also increases. Current database servers use a common technique of locating data by utilizing index files. The index files cross-reference sub-sets of information with a physical location of the data within the database. Even database servers based on hash algorithms must rely on index files, particularly when the data is to be accessed by more than one element. When creating a database table in a relational database, the designer must understand how the table will be used and create appropriate indexes. Unfortunately, when the nature of the data request does not match the indexing of the table, the index overhead is wasted and the search for data becomes a costly sequential process. For larger database systems, index information may become very large and ineffective. The index information cannot be compressed, because it must be readily available for a data request. Consequently, larger systems require a more novel means of handling and analyzing data, because of the reliance on index information.

Accordingly, there is a need in the art for a data management system for managing large volumes of data that is not dependent on index information.

There is also a need in the art for a data management system for managing large volumes of data that reduces the amount of necessary disk space required to store such data.

Additionally, there is a need in the art for a data management system for managing large volumes of data that reduces the amount of cost necessary to manage such data.

SUMMARY

Generally described, the present invention comprises a system and methods for organizing and querying data within a linear grid management system. Data having at least two dimensions is associated with physical locations within the linear grid management system, where a first dimension is associated with a node and a second dimension is associated with a data storage identifier (e.g., file name) of a memory storage device. The data may have a third dimension which provides a field for ordering data within the memory storage device. More specifically described, the first dimension represents a particular store (e.g., "where"), the second dimension represents a particular date or time (e.g., "when"), and the third dimension represents a product (e.g., "what"). Metadata may be used to map a logical table to the data stored in the memory storage device, where the metadata has at least one data field attribute that describes a portion of the data. For example, the metadata may comprise a first data field attribute that describes the first dimension of data, a second data field attribute that describes the second dimension of data, and a third data field attribute that describes the third dimension of data.

A data query typically has at least one condition relating to the at least two dimensions of data. Accordingly, the data query may be divided into multiple subqueries, wherein each subquery is related directly to one node associated with at least one data storage identifier related to at least one memory storage device. If the data query requires access to an external database, a preSQL and postSQL process may be generated to filter internal data subrequests and retrieve support column data. Upon receiving a data subrequest, a node may generate a unique and efficient parsing process that retrieves the data from the appropriate memory storage devices. Subrequests may be managed by a dispatcher that determines when to provide the subrequests to the appropriate nodes.

Other features and advantages of the present invention will become apparent upon reading and understanding the present specification when taken in conjunction with the appended drawings.

DETAILED DESCRIPTION OF EMBODIMENTS OF THE INVENTION

Figure 1:
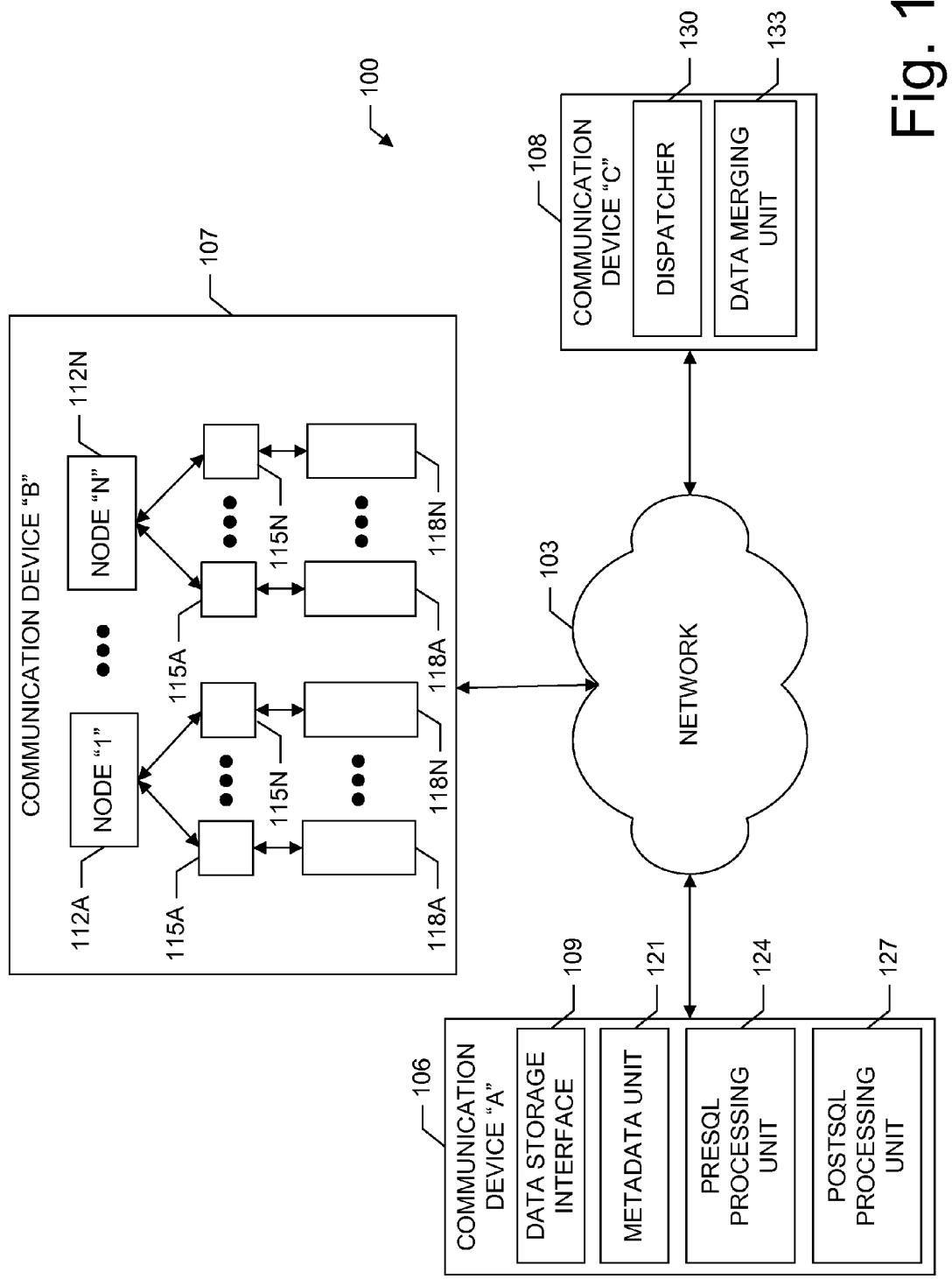
FIG. 1 displays a block diagram representation of a linear grid management system in accordance with some embodiments of the present invention.

Referring now to the drawings, in which like numerals represent like components or steps throughout the several views, FIG. 1 displays a block diagram representation of a linear grid management system 100 in accordance with some embodiments of the present invention. The linear grid management system 100 comprises a plurality of communication devices 106-108 connected together via a communication network 103 (i.e., also referred to herein as a "network 103"). One skilled in the art will recognize that the network 103 typically contains the infrastructure and facilities appropriate to connect a group of two or more communication devices 106-108 (including, without limitation, a plurality of computer systems in communication with each other). The network 103 and communication devices 106-108 may be configured in multiple network topologies including, but not limited to, star, bus, or ring configurations. Also, the network 103 and communication devices 106-108 may be broadly categorized as belonging to a particular architecture including, but not limited to, peer-to-peer or client/server architectures. The network 103 may additionally be classified by the geographical location of the communication devices 106-108 and the types thereof. For example, if the network 103 connects a plurality of computer systems or servers located proximate to each other, such as within a building, the network 103 is referred to as a local-area network (LAN); if the computer systems are located farther apart, the network 103 is generally referred to as a wide-area network (WAN), such as the Internet; if the computer systems are located within a limited geographical area, such as a university campus or military establishment, the network 103 is referred to as a campus-area network (CAN); if the computer systems are connected together within a city or town, the network 103 is referred to as a metropolitan-area network (MAN); and if the computer systems are connected together within a user's home, the network 103 is referred to as a home-area network (HAN).

The number of communication devices 106-108 within the linear grid management system 100 may vary depending on the requirements of the linear grid management system 100. Although FIG. 1 illustrates three communication devices 106-108 connected to the linear grid management system 100, those skilled in the art will appreciate that any number of communication devices 106-108 may be connected to the linear grid management system 100 without departing from the scope of the present invention. The communication devices 106-108 connect to the network 103 and, therefore, connect with each other communication device 106-108. Each communication device 106-108, through use of a network interface and other appropriate hardware and software components, connects to the network 103 for bi-directional communication of signals and data therewith and, therefore, connects communicatively to each other communication device 106-108 for the bi-directional communication of signals and data therewith.

In one embodiment of the present invention, a communication device 106 comprises a data storage interface 109, a metadata unit 121, a preSQL processing unit 124, a postSQL processing unit 127, a dispatcher 130, a data merging unit 133, and a plurality of nodes 112A-112N connected with a plurality of data storage identifiers 115A-115N where each identifies a memory storage device 118A-118N. While a communication device 106 may comprise all of the aforementioned components, one skilled in the art will recognize that the aforementioned components may reside on different communication devices 106-108 within a distributed system.

For example and without limitation, FIG. 1 displays a first communication device 106 comprising the data storage interface 109, metadata unit 121, preSQL processing unit 124, and postSQL processing unit 127. A second communication device 107 includes a plurality of nodes 112A-112N each of which are connected with a plurality of data storage identifiers 115A-115N identifying multiple memory storage devices 118A-118N. A third communication device 108 includes the dispatcher 130 and data merging unit 133.

In one embodiment of the present invention, the data storage interface 109 is adapted to receive data for storage, receive data queries for data retrieval, and provide results received from a data query. The data received by the data storage interface 109 for storage typically has at least two dimensions. The two dimensions of data provide the linear grid management system 100 with the necessary structure to generate a grid-based database system. A first dimension of the data is associated with a node 112 of the communication device 107, wherein the data is provided to the appropriate node 112 for storage. This node 112 corresponds to the value of the first dimension of the data. A second dimension of the data is associated with a data storage identifier 115, wherein the data is stored by the appropriate data storage identifier 115 that corresponds to the value of the second dimension of the data. Each data storage identifier 115 is associated with a memory storage device 118 which stores the received data and provides the stored data upon request from the data storage interface 109. When the data storage interface 109 receives the data for storage, the data storage interface 109 sends the data to the node 112 that is associated with the first dimension of the data. The appropriate node 112 then provides the data to the appropriate data storage identifier 115 associated with the second dimension of the data. The data storage identifier 115 then provides the data to the corresponding memory storage device 118 for storage.

When the data storage interface 109 receives a data query requesting data, the data storage interface 109 processes the data query (described in more detail below with reference to FIG. 3) and provides the processed data query to the dispatcher 130 for generating the proper data requests to the appropriate nodes 112. Upon receiving the result set (e.g., the merged results from each of the nodes 112) from the data merging unit 133 (described in more detail below), the data storage interface 109 provides the retrieved data to the requesting source (e.g., displays the results or provides the results to an external system that made the initial request). One skilled in the art will recognize that such retrieved data may be utilized to generate a report or data result table.

In one embodiment of the present invention, the data received by the data storage interface 109 has the dimensions of "where," "when," and "what." For example, the data of a retail business may represent a product (the "what" dimension) purchased on a particular day (the "when" dimension) at a particular store (the "where" dimension). To eliminate the use of indexes within a database, the linear grid management system 100 may make physical associations between the dimensions associated with the data and the location of the data within the database. A node 112 within the linear grid management system 100 may be associated with a particular store (the "where" dimension), while a data storage identifier 115 may be associated with a particular day (the "when" dimension). With the store and day, the linear grid management system 100 may immediately identify the node 112 and data storage identifier 115 containing the data, wherein the product (the "what" dimension) is part of the data stored in the memory storage device 118 associated with the appropriate data storage identifier 115. In particular, the product (the "what" dimension) may be used as the sorted order of the data within the memory storage device 118, and, consequently, allows for efficient searches of a specific item within the memory storage device 118. By eliminating the use of indexes, the linear grid management system 100 may compress the data within the memory storage devices 118 and, therefore, significantly reduce the amount of memory required to house the data. This provides an advantage over current systems, because the reduction in memory space required to store the data results in cost savings, over current systems, for implementing the linear grid management system 100.

The metadata unit 121 contains hardware and/or software that maps a logical table to the data stored in one or more of the memory storage devices 118. Instead of depending on indexes as other database models require, the linear grid management system 100 may utilize metadata to describe portions of data in the memory storage devices 118. The metadata unit 121 contains data field attributes to define a relationship between a logical table and the physical data stored in the memory storage devices 118. Additionally, the metadata unit 121 may assign the logical table to a standard distribution file that associates the first dimension of the data (e.g., "where") to a physical node 112, where the first dimension of the data is designated with a data field attribute identifying the first dimension of the data as a node. For example, Table 1 displays metadata and a logical table illustrating the mapping between the metadata and field data within the memory storage devices 118. In this example, the store number (the "where" dimension) is designated as a node 112, the date (the "when" dimension) is designated as a file name (e.g., data storage identifier 115), and the product number (the "what" dimension) is designated as a combine index. One skilled in the art will recognize that the metadata may comprise various data field attributes to adequately describe the data stored in the database.

TABLE 1

| Filename: | metadata_customer | | | | | |
|---|---|---|---|---|---|---|
| Contents: | Custom table definitions | | | | | |
| Keys: | CHR = Character | | | | | |
| Keys: | UI = Un-packed Integer | | | | | |
| Keys: | UD = Un-packed Decimal | | | | | |
| Keys: | DT = Date | | | | | |
| | Length 5 = yyww (DT1) | | | | | |
| | Length 10 = mm/dd/yyyy (DT2) | | | | | |
| Index types: | N = Node hash | | | | | |
| Index types: | F = File name | | | | | |
| Index types: | I = Combine index | | | | | |
| Physical type: | C = Compressed | | | | | |
| Physical type: | F = Flat file | | | | | |
| Physical type: | M = Point of Sale Log | | | | | |
| Physical type: | S = System usage | | | | | |
| Physical Name: | Daily_Point_Of_Sale | | | Physical Type: | | C |
| Column | Number | Column Name | Type | Length | String | Field Comments |
| --- | --- | --- | --- | --- | --- | --- |
| N | 1 | STORE_NBR | UI | 4 | 500 | 1 |
| F | 2 | Year_Week | DT | 5 | 500 | 2 format cyymm |
| I | 3 | Item_Number | UI | 9 | 500 | 3 |
| | 6 | Report_Code | CHR | 1 | 500 | 4 |
| | 7 | Sell_Price | UD | 9 | 500 | 5 |
| | 8 | Wkly_Sales | UD | 10 | 500 | 6 |
| | 9 | Wkly_Qty | UI | 5 | 500 | 7 |
| | 10 | Sat_Qty | UI | 5 | 500 | 8 |
| | 11 | Sun_Qty | UI | 5 | 500 | 9 |
| | 12 | Mon_Qty | UI | 5 | 500 | 10 |
| | 13 | Tue_Qty | UI | 5 | 500 | 11 |
| | 14 | Wed_Qty | UI | 5 | 500 | 12 |
| | 15 | Thu_Qty | UI | 5 | 500 | 13 |
| | 16 | Fri_Qty | UI | 5 | 500 | 14 |

When the data storage interface 109 receives a data query requesting data, the data storage interface 109 determines whether the data query requires accessing an external database (e.g., external to the linear grid management system 100). If the data storage interface 109 determines that accessing an external database is required, then the data storage interface 109 provides the data query to the preSQL processing unit 124. The preSQL processing unit 124 may create one or more external filter queries (e.g., queries designed to narrow or focus the subsequent, internal queries of the nodes 112) from the submitted data query, where the external filter queries are generated from references to the support tables within the original data query and where the external filter queries are provided to the external database. The preSQL processing unit 124 may also format and validate the result set (e.g., the data set) received from the external database after processing the external filter queries. From the result set, the preSQL processing unit 124 creates a subset of subqueries for various nodes 112 of the linear grid management system 100. The preSQL processing unit 124 then provides the subqueries to the specified nodes 112, such as through the dispatcher 130. In one embodiment of the present invention, the preSQL processing unit 124 uses the result set received from the external database (after processing the generated external filter queries) as a filter for searching the database of the linear grid management system 100. More particularly, the preSQL processing unit 124 uses the result set as a list of matching conditions for searching items in the linear grid management system 100. Accordingly, the preSQL processing unit 124 may effectively narrow (e.g., filter) the necessary data queries performed on the data within the present system, resulting in a more efficient data retrieval process.

When the data storage interface 109 receives a data query requesting data, the data storage interface 109 determines whether the data query requires accessing an external database. If the data storage interface 109 determines that accessing an external database is required, then the data storage interface 109 provides the data query to the postSQL processing unit 127. The linear grid management system 100 does not require storing copies of data and support tables from external databases 306 and, therefore, accesses the external databases 306, when necessary, to obtain support tables for a submitted data query. The postSQL processing unit 127 defines an external database table and prepares a load of data for the external database table. The postSQL processing unit 127 then creates and submits an external support column query to the external database. Upon receiving the result set from the external database after processing the external support column query, the postSQL processing unit 127 loads the received data (which defines the external tables) into the created external database table. The postSQL processing unit 127 uses the result set received from the external database to create at least one subquery for at least one node 112. Finally, the postSQL processing unit 127 provides the subquery(ies) to the node(s) 112. In summary, the postSQL processing unit 127 merges the data received from the nodes 112 with the external tables acquired from accessing the external database with the external support column query.

As discussed above, the data storage interface 109, through the dispatcher 130, provides the submitted data query or created subqueries to the appropriate nodes 112 of the linear gird management system 100. Each node 112 is configured with hardware and software appropriate to perform tasks and provide capabilities and functionality as described herein. Each node 112 is associated with a first dimension (e.g., the "where" dimension) of the data stored within the memory storage devices 118. Accordingly, the nodes 112 provide a physical location identified by the first dimension of the data. Each node 112 comprises at least one data storage identifier 115, wherein each data storage identifier 115 corresponds to a memory storage device 118. Each data storage identifier 115 is associated to the second dimension (e.g., the "when" dimension) of the data, wherein the data storage identifier 115 provides a physical location identified by the second dimension of the data. As discussed in more detail below, each node 112 receives a data query or subquery referencing the first dimension of the data. Each node 112 creates one or more parsing processes that may be executed independently from parsing processes occurring at other nodes 112. Each parsing process may create a list of memory storage devices 118 to search based on the second dimension (e.g., the "when" dimension) of the data. Then, each parsing process accesses the appropriate memory storage devices 118 to uncompress, open, and read the memory storage devices 118 for relevant data. Each parsing process parses the data stored in each memory storage device 118 to retrieve the appropriate data requested by the received data query or subquery.

The memory storage device 118 stores data that has at least two dimensions. In one embodiment of the present invention, the data within the memory storage device 118 is ordered by a third dimension (e.g., the "what" dimension) of the data. The memory storage device 118 may be a memory device capable of storing and retrieving data including, but not limited to, volatile and/or non-volatile memory. The multi-dimensional data may be stored in a variety of formats within memory storage device 118. For example, the memory storage device 118 may include a flat file identified by a file name (e.g., the data storage identifier 115). The memory storage device 118 may receive the multi-dimensional data from the data storage interface 109 through a particular node 112. The memory storage device 118 may then store the multi-dimensional data and provide the multi-dimensional data to the data storage interface 109, the node 112, or the dispatcher 130.

The dispatcher 130 receives a submitted data query or created subqueries from either the data storage interface 109, the preSQL processing unit 124, or the postSQL processing unit 127 and provides the submitted data query or created subqueries to the appropriate nodes 112 or external database. The dispatcher 130 also receives result sets from the appropriate nodes 112 or the external database 306 and provides the received result sets to either a data merging unit 133, the data storage interface 109, the preSQL processing unit 124, or the postSQL processing unit 127. The dispatcher 130 may also determine whether a data query has been submitted (e.g., from the data storage interface 109). In operation, the dispatcher 130 retrieves the data query from a common memory space and calculates the workload capacity for each appropriate node 112 related to the data query. The dispatcher 130 then creates a data subrequest(s) relating to an appropriate node 112 and provides the data subrequest to the appropriate node 112, when the appropriate node's 112 workload capacity is within a predetermined ranged. As an example, the dispatcher 130 may dispatch the data subrequest by creating a request file that contains a header followed by the data subrequest text. Generally, one request file is created for each appropriate node 112 being used to fulfill the data query and the request file may be placed in common memory (e.g., shared memory between several of the components of the linear grid management system 100) for the appropriate node 112 to retrieve. The dispatcher 130 and nodes 112 may utilize a special lock file to synchronize requests, which is also maintained on the common memory.

The data merging unit 133 retrieves or receives the result sets from the nodes 112 or external database 306 (after being accessed by the preSQL processing unit 124 or the postSQL processing unit 127) and may merge all of the result sets into a single final results set representing the originally submitted data query that was provided to the data storage interface 109. Accordingly, the data merging unit 133 receives result sets from an external database 306, the preSQL processing unit 124, the postSQL processing unit 127, or the dispatcher 130. Further, the data merging unit 133 retrieves results sets from a common memory space and merges all received and/or retrieved result sets. Also, the data merging unit 133 validates the final results created through the merge and provides the final results set to the data storage interface 109 for display or reporting.

One skilled in the art will recognize that portions of the linear grid management system, discussed above, may be connected through any appropriate type of connection for bi-directional communication of signals and/or media including, but not limited to, analog, digital, wired and wireless communication channels. Such communication channels may utilize, but not be limited to, copper wire, optical fiber, radio frequency, infrared, satellite, or other facilities and media.

Figure 2:
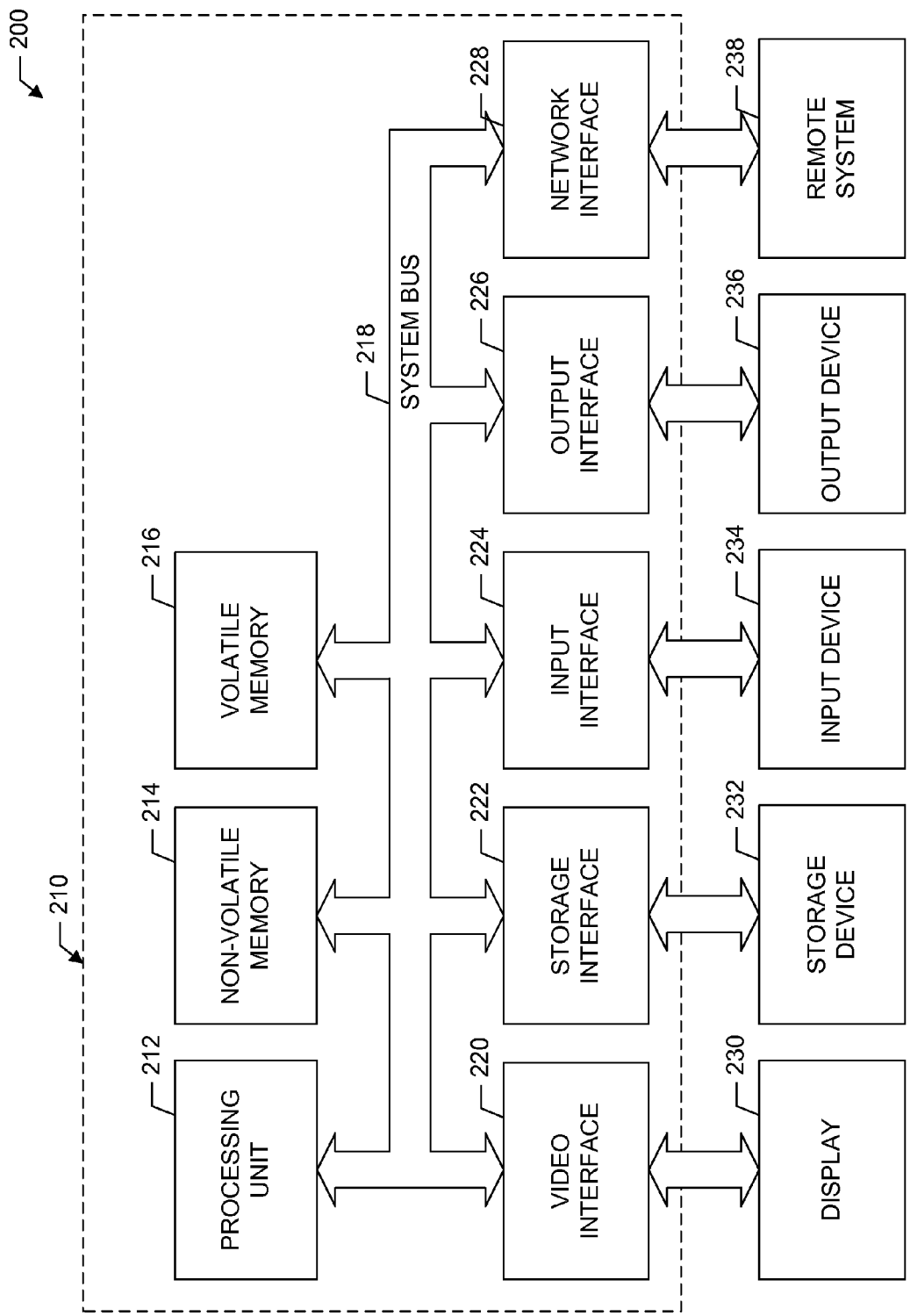
FIG. 2 displays a block diagram representation of a computing environment which may be utilized in accordance with some embodiments of the present invention.

FIG. 2 displays a block diagram representation of a computing environment 200 which may be utilized in accordance with some embodiments of the present invention. Communication devices 106-108 of the linear grid management system 100 may include, but are not limited to, personal computers, mainframe computers, servers, hand-held or laptop devices, multiprocessor systems, microprocessor-based systems, set top boxes, programmable consumer electronics, network PCs, minicomputers, mainframe computers, distributed computing environments that include any of the above systems or devices, and the like. It should be understood, however, that the features and aspects of the exemplary embodiment of the present invention may be implemented by or into a variety of systems and system configurations and any examples provided within this description are for illustrative purposes only.

FIG. 2 and the following discussion provide a general overview of a platform onto which an embodiment of the present invention, or portions thereof, may be integrated, implemented, and/or executed. Although reference has been made to instructions within a software program being executed by a processing unit, those skilled in the art will understand that at least some of the functions performed by the software may also be implemented by using hardware components, state machines, or a combination of any of these techniques. In addition, a software program which may implement an embodiment of the present invention may also run as a stand-alone program or as a software module, routine, or function call, operating in conjunction with an operating system, another program, system call, interrupt routine, library routine, or the like. The term program module is used herein to refer to software programs, routines, functions, macros, data, data structures, or any set of machine readable instructions or object code, or software instructions that may be compiled into such, and executed by a processing unit 212.

Turning now to the figure, computing device 210 (e.g., communication device 106) may comprise various components including, but not limited to, a processing unit 212, a non-volatile memory 214, a volatile memory 216, and a system bus 218 that couples the non-volatile memory 214 and the volatile memory 216 to the processing unit 212. The non-volatile memory 214 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, battery backed random access memory (RAM), CDROM, digital versatile disks (DVD) or other optical disk storage, magnetic cassettes, magnetic tape, magneto-optical storage devices, magnetic disk storage or other magnetic storage devices, or any other medium which may be used to store the desired information. The non-volatile memory 214 may provide storage for power-on and reset routines (bootstrap routines) that are invoked upon applying power or resetting the computing device 210. In some configurations the non-volatile memory 214 may provide the basic input/output system (BIOS) routines that are utilized to perform the transfer of information between elements within the various components of the computing device 210.

The volatile memory 216 may include, but is not limited to, a variety of memory types and devices including, but not limited to, random access memory (RAM), dynamic random access memory (DRAM), synchronous dynamic random access memory (SDRAM), double data rate synchronous dynamic random access memory (DDR-SDRAM), bubble memory, registers, or the like. The volatile memory 216 may provide temporary storage for routines, modules, functions, macros, data, etc. that are being or may be executed by, or are being accessed or modified by, the processing unit 212.

Alternatively, the non-volatile memory 214 and/or the volatile memory 216 may be a remote storage facility accessible through a wired and/or wireless network system. Additionally, the non-volatile memory 214 and/or the volatile memory 216 may be a memory system comprising a multi-stage system of primary and secondary memory devices, as described above. The primary memory device and secondary memory device may operate as a cache for the other or the second memory device may serve as a backup to the primary memory device. In yet another embodiment, the non-volatile memory 214 and/or the volatile memory 216 may comprise a memory device configured as a simple database file or as a searchable, relational database using a query language, such as SQL.

The computing device 210 may access one or more external display devices 230 such as a CRT monitor, LCD panel, LED panel, electro-luminescent panel, or other display device, for the purpose of providing information or computing results to a user. In some embodiments, the external display device 230 may actually be incorporated into the product itself. For example, the computing device 210 may be a mobile device having a display device 230. The processing unit 212 may interface to each display device 230 through a video interface 220 coupled to the processing unit 210 over the system bus 218.

In operation, the computing device 210 sends output information to the display 230 and to one or more output devices 236 such as a speaker, modem, printer, plotter, facsimile machine, RF or infrared transmitter, computer or any other of a variety of devices that may be controlled by the computing device 210. The processing unit 212 may interface to each output device 236 through an output interface 226 coupled to the processing unit 212 over the system bus 218.

The computing device 210 may receive input or commands from one or more input devices 234 such as, but not limited to, a keyboard, pointing device, mouse, modem, RF or infrared receiver, microphone, joystick, track ball, light pen, game pad, scanner, camera, computer or the like. The processing unit 212 may interface to each input device 234 through an input interface 224 coupled to the processing unit 212 over the system bus 218.

It will be appreciated that program modules implementing various embodiments of the present invention may be stored in the non-volatile memory 214, the volatile memory 216, or in a remote memory storage device accessible through the output interface 226 and the input interface 224. The program modules may include an operating system, application programs, other program modules, and program data. The processing unit 212 may access various portions of the program modules in response to the various instructions contained therein, as well as under the direction of events occurring or being received over the input interface 224.

The computing device 210 may provide data to and receive data from one or more other storage devices 232, which may provide volatile or non-volatile memory for storage and which may be accessed by computing device 210. The processing unit 212 may interface to each storage device 232 through a storage interface 222 over the system bus 218.

The interfaces 220, 222, 224, 226, and 228 may include one or more of a variety of interfaces, including but not limited to, cable modems, DSL, T1, T3, optical carrier (e.g., OC-3), V series modems, an RS-232 serial port interface or other serial port interface, a parallel port interface, a universal serial bus (USB), a general purpose interface bus (GPIB), an optical interface such as infrared or IrDA, an RF or wireless interface such as Bluetooth, or other interface.

Figure 3:
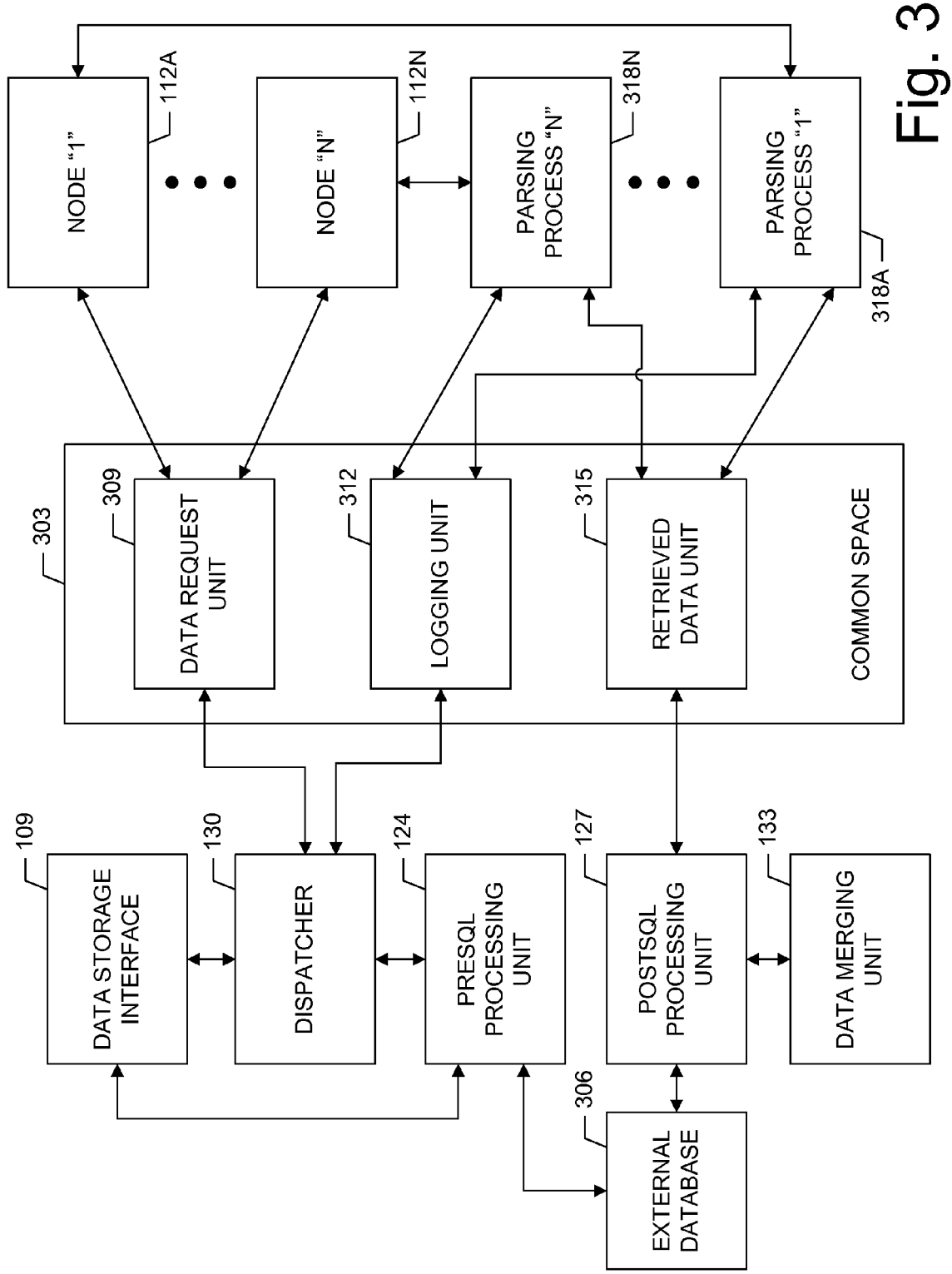
FIG. 3 displays a block diagram representation of a linear grid management system with common space for node communication in accordance with some embodiments of the present invention.

FIG. 3 displays a block diagram representation of a linear grid management system 100 with common space 303 for node 112 communications in accordance with some embodiments of the present invention. To facilitate multiple data subqueries and multiple parsing processes, the linear grid management system 100 may use a common space memory 303 which is shared between the communication devices 106-108. The common space memory 303 may be a memory device capable of storing and retrieving data including, but not limited to, volatile and/or non-volatile memory. The common space memory 303 may receive and provide data requests and/or subrequests, log data, and retrieved data (e.g., retrieved result sets from a node 112 or external database 306). Accordingly, the common space memory 303 may be connected to the database storage interface 109, preSQL processing unit 124, postSQL processing unit 127, dispatcher 130, data merging unit 133, nodes 112A-112N, and corresponding parsing processes 318A-318N.

The common space memory 303 may contain a data request unit 309, logging unit 312, and retrieved data unit 315. More specifically, the data request unit 309, logging unit 312, and retrieved data unit 315 may be a memory device similar to, but not limited to, volatile and/or non-volatile memory. The data request unit 309 receives and provides data requests and subrequests from or to the data storage interface 109, the dispatcher 130, the preSQL processing unit 124, the postSQL processing unit 127, and/or the nodes 112. The logging unit 312 receives and provides log data to and from the dispatcher 130, the data storage interface 109, the preSQL processing unit 124, the postSQL processing unit 127, and/or the parsing processes 318A-318N. The retrieved data unit 315 receives and provides data results sets from and to the parsing processes 318A-318N via the nodes 112, the dispatcher 130, the preSQL processing unit 124, the postSQL processing unit 127, and/or the data merging unit 133. One skilled in the art will recognize that the data request unit 309, the logging unit 312 and the retrieved data unit 315 may be separate memory devices or may be predetermined portions of a single memory device, such as the common space memory 303.

As described for fully below with reference to FIG. 4, each node 112 may create at least one parsing process 318 for accessing data stored in the appropriate memory storage devices 118. The parsing process 318 may generate a list of memory devices 118 to query, based on the received data request or subrequest. After generating the list, the parsing process 318 accesses each memory storage device 118 in the generated list, which may include uncompressing, opening, and reading each memory storage device 118. Once the parsing process 318 has accessed each appropriate memory storage device 118, the parsing process 318 parses the data stored in each memory storage device 118 based on the original data request or subrequest provided to the node 112. Accordingly, multiple parsing processes 318A-318N may be created and processed simultaneously. Each parsing process 318 may generate a results set from accessing the memory storage devices 118 and may provide the results set to the retrieved data unit 315 of the common space memory 303.

In one embodiment of the present invention, the data storage interface 109 may receive a data query requesting certain data from the linear grid management system 100. The data storage interface 109 may parse and validate the data query (by, for example, accessing the metadata unit 121), wherein the data storage interface 109 may determine whether the received data query requires accessing an external database 306. If the data storage interface 109 determines that the received data query requires accessing an external database 306, the data storage interface 109 provides the data query to the preSQL processing unit 124 and postSQL processing unit 127. After receiving the data query, the preSQL processing unit 124 generates an external filter query, which is sent to the external database 306. The external database 306 provides a result set to the preSQL processing unit 124, where the preSQL processing unit 124 uses the result set from the external database 306 as a list of matching conditions for searching data via the nodes 112. Accordingly, subrequests may be generated for each appropriate node 112 reflecting the list of matching conditions for filtering purposes. The subrequests are provided to the dispatcher 130 (or, alternatively, to the data request unit 309 of the common space memory 303), where the dispatcher 130 calculates the workload capacity of each node 112A-112N. The dispatcher 130 then submits log data to the logging unit 312 and schedules the subrequests for execution by the nodes 112. If necessary, the dispatcher 130 also provides the subrequests to the data requesting unit 309 for storage. The appropriate nodes 112 may then receive the subrequests from the data requesting unit 309 (or, alternatively, from the dispatcher 130). Based on the subrequest, the node 112 may generate and execute at least one parsing process 318, which accesses data stored in the appropriate memory storage devices 118. The parsing processes 318A-318N then provides the result sets generated from accessing the memory storage devices 118 to the retrieved data unit 316 and provides log data to the logging unit 312 to indicate that the result set from the appropriate node 112 is available. After determining that the result set is available by accessing the log data in the logging unit 312, the dispatcher 130 retrieves the result set from the retrieved data unit 315 and provides the result set to the postSQL processing unit 127 or the data merging unit 133. Alternatively, the data merging unit 133 or the postSQL processing unit 127 determines that the result set is available by accessing the log data in the logging unit 312, and retrieves the result set from the retrieved data unit 315. Next, the postSQL processing unit 127 generates an external support query and provides the external support query to the external database 306 to retrieve the support column data, which may be merged with the retrieved result set. Alternatively, the postSQL processing unit 127 may provide the retrieved result set and the retrieved support column data to the data merging unit 133, which performs the merge between the results set and support column data. The data merging unit 133 receives or retrieves all result sets stored in the retrieved data unit 315 and merges all of the result sets to produce a final result set that reflects all of the data requested in the original data query provided to the data storage interface 109. The data merging unit 133 then provides the final result set to the data storage interface 109 or other requesting process for display or reporting.

Figure 4:
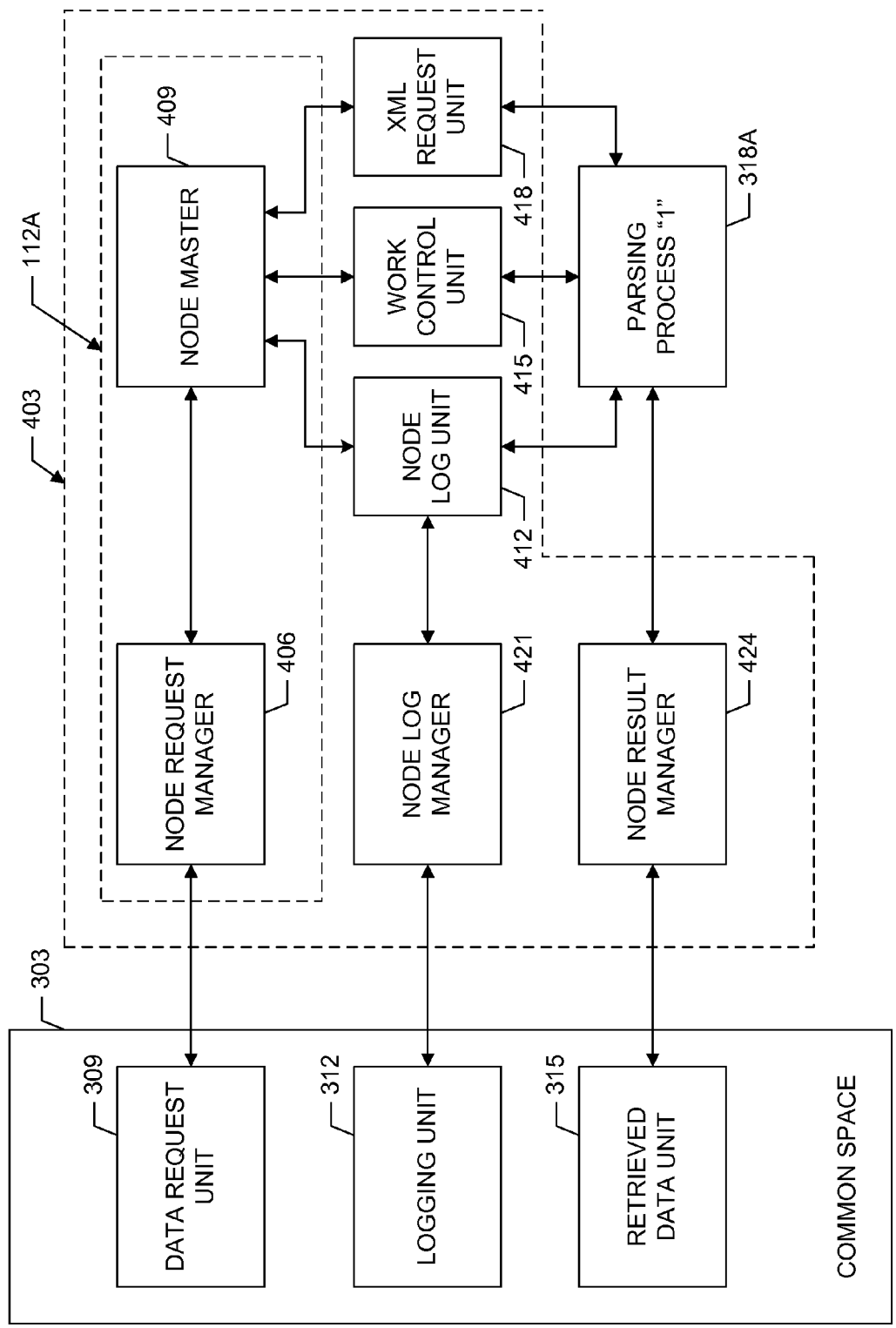
FIG. 4 displays a block diagram representation of a node environment in accordance with some embodiments of the present invention.

FIG. 4 displays a block diagram representation of a node environment 403 in accordance with some embodiments of the present invention. To properly facilitate multiple data queries, each node 112 may reside in a node environment 403, wherein the node environment 403 is capable of facilitating all of the necessary activity of the node 112. The node environment 403 contains the node 112, node log manager 421, node result manager 424, node log unit 412, work control unit 415, and XML (extensible markup language) request unit 418. Additionally, the specific node 112 may contain a node request manager 406 and a node master 409.

The node request manager 406 monitors the data request unit 309 of the common space memory 303 for new data requests. When a new data request arrives in the data request unit 309, the node request manager 406 retrieves the new data request from the data request unit 309. Next, the node request manager 406 prepares the new data request for processing and provides log data to the node log unit 412, indicating that a new data request is ready for execution. Finally, the node request manager 406 provides the new data request to the node master 409.

Generally, the node master 409 receives a new data request from the node request manager 406. Upon receiving the new data request, the node master 409 generates a specific and efficient parsing process 318 and provides a request to the work control unit 415 to schedule execution of the parsing process 318. The node master 409 then dispatches the parsing process 318 when instructed by the work control unit 415. At the node environment 403, the node master 409 operates similarly to the dispatcher 130 of the linear grid management system 100 and, therefore, controls the work flow (e.g., requests for data) of the corresponding node 112.

The node log unit 412 communicates connectively to the node master 409, parsing process 318, and node log manager 421. More specifically, the node log unit 412 is operable for receiving log data from the node master 409 and parsing process 318 and providing log data to the node log manager 421. In one embodiment of the present invention, the node master 409 provides the node log unit 412 with log data after scheduling a parsing process 318 with the work control unit 416. Also, the parsing process 318 provides log data to the node log unit 412 upon providing a result set to the node result manager 424. In response to receiving log data, the node log unit 412 provides the log data to the node log manager 421, as described below.

The work control unit 415 communicates with both the node master 409 and parsing process 318. The work control unit 415 also receives a request from the node master 409 to execute a parsing process 318 and instructs the node master 409 that the parsing process 318 may be executed at a particular time. In other words, the work control unit 416 simulates a work queue where scheduled requests for executing a parsing process are executed in a particular order. The work control unit 415 may also be operable via the node master 409 for initiating execution of the parsing process 318.

The XML request unit 418 communicates with the node master 409 and the parsing process 318. An XML request is typically created by preSQL processing unit 124 after all activity with external database 306 has been successfully completed. The XML request is then dispatched to each node 112 by the dispatcher 130 via the dispatcher request unit 309. The XML request may be received by the node request manager 406, where the node master 409 provides the XML request to the XML request unit 418 for processing. The XML request unit 418 receives XML requests from the node master 409 that, when executed, initiate execution of the parsing process 318. More specifically, the XML request unit 418 schedules the execution of the parsing process 318, which is then dispatched by the node master 409. For example and not limitation, the node master 409 may be notified by the work control unit 415 that a particular parsing process 318 may be executed. Accordingly, the XML request unit 418 performs the received XML request by initiating execution of the parsing process 318. The node master 409 may then provide an XML request to the XML request unit 418 indicating that the parsing process 318 is being executed. One skilled in the art will recognize that a script other than XML may be used within the scope of the invention and, therefore, the present invention is not limited to an XML request unit 418 or XML script as described above.

The node log manager 421 is communicates with the node log unit 412 and the logging unit 312 of the common space memory 303. More particularly, the node log manager 421 receives log data from the node log unit 412 indicating that the node master 409 has scheduled a request with the work control unit 415. The node log manager 421 also receives log data from the node log unit 412 indicating that the parsing process 318 has finished execution. The node log manager 421 provides the log data to the logging unit 312 so that the dispatcher 130, the postSQL processing unit 127, the data storage interface 109, or the data merging unit 133 may be notified when a subquery has been scheduled and/or performed.

The node result manager 424 is connected with the parsing process 318 and retrieved data unit 315. Further, the node result manager receives a data result set from the parsing process 318 (where the data result set is generated from querying a memory storage device 118) and provides the received data result set to the retrieved data unit 316 of the common space memory 303. In other words, the parsing process 318 provides the data result set to the node result manager 424, which in turn provides the data result set to the retrieved data unit 315.

In operation, the node request manager 406 retrieves a new data request from the data request unit 309 and provides log data to the log unit 412 indicating that a new data request has been received. The node log unit 412 provides the log data to the node log manager 421, which provides the log data to the logging unit 312 of the common space memory 303. The node request manager 406 then provides the data request to the node master 409, which generates a parsing process 318 related to the received data request. Next, the node master 409 schedules an execution of the parsing process 318 with the work control unit 415. When the work control unit 415 determines that the parsing process 318 should be executed, the work control unit 416 notifies the node master 409, which provides an XML request to the XML request unit 418 instructing that the parsing process 318 should be executed. The XML request unit 418 processes the XML request and, accordingly, begins execution of the parsing process 318. Once the parsing process 318 generates a result set from querying the appropriate memory storage devices 118, the parsing process 318 provides the result set to the node result manager 424 and provides log data to the node log unit 412 indicating that a result set has been generated. The node log unit 412 then provides the log data to the node log manager 421, which provides the log data to the logging unit 312 of the common space memory 303. Once the node result manager 424 receives the result set from the parsing process 318, the node result manager 424 provides the result set to the retrieved data unit 315 of the common space memory 303.

Figure 5:
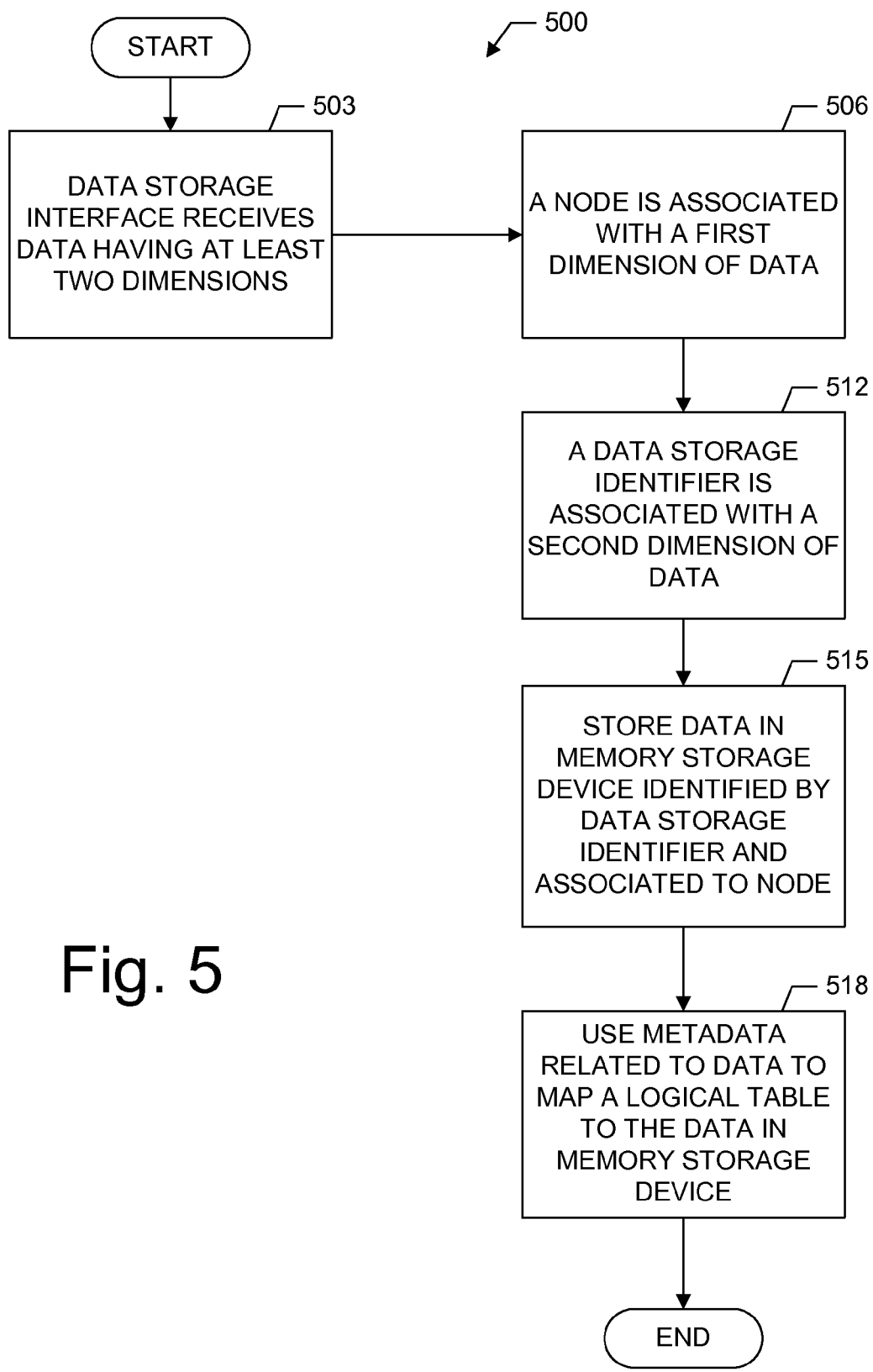
FIG. 5 displays a logic flow diagram representing a method of organizing data using a linear grid management system in accordance with some embodiments of the present invention.

FIG. 5 displays a logic flow diagram representing a method 500 of organizing data using a linear grid management system 100 in accordance with some embodiments of the present invention. The linear grid management system 100 provides a cost-efficient database utilizing independent processes to solve a single query request. By using at least two dimensions of the data, the linear grid management system 100 eliminates the need for index files and, therefore, allows data to be substantially compressed. The storing and organizing of data within the linear grid management system 100 implements a relationship between the dimensions of the data and physical attributes of where the data is located within the database.

The method 500 of organizing data using a linear grid management system 100 begins at 503, where the data storage interface 109 receives data for storage having at least two dimensions. The linear grid management system 100 uses two dimensions to organize and store the data, but one skilled in the art will recognize that the data may have multiple dimensions of data, wherein the linear grid management system 100 may select particular dimensions of the data for organization and storage. At 506, a node 112, having a physical location within a communication device 107, is associated with a first dimension of the data (e.g., the "where" dimension). Next, at 512, a data storage identifier 115, which identifies a memory storage device 118 with a physical location within a communication device 107, is associated with a second dimension of the data (e.g., the "when" dimension). The data is then stored 515 in a memory storage device 118 identified by the data storage identifier 115 and associated with the node 112. In another embodiment of the present invention, the data may have a third dimension (e.g., the "what" dimension), wherein the data is stored within the memory storage device 118 in a particular order defined by the third dimension.

Next, the metadata unit 121 maps 518 a logical table to the data in the memory storage device 118, by using field attributes defined within the predetermined metadata. Finally, the data storage interface 109 terminates operation in accordance with method 500.

Figure 6A:
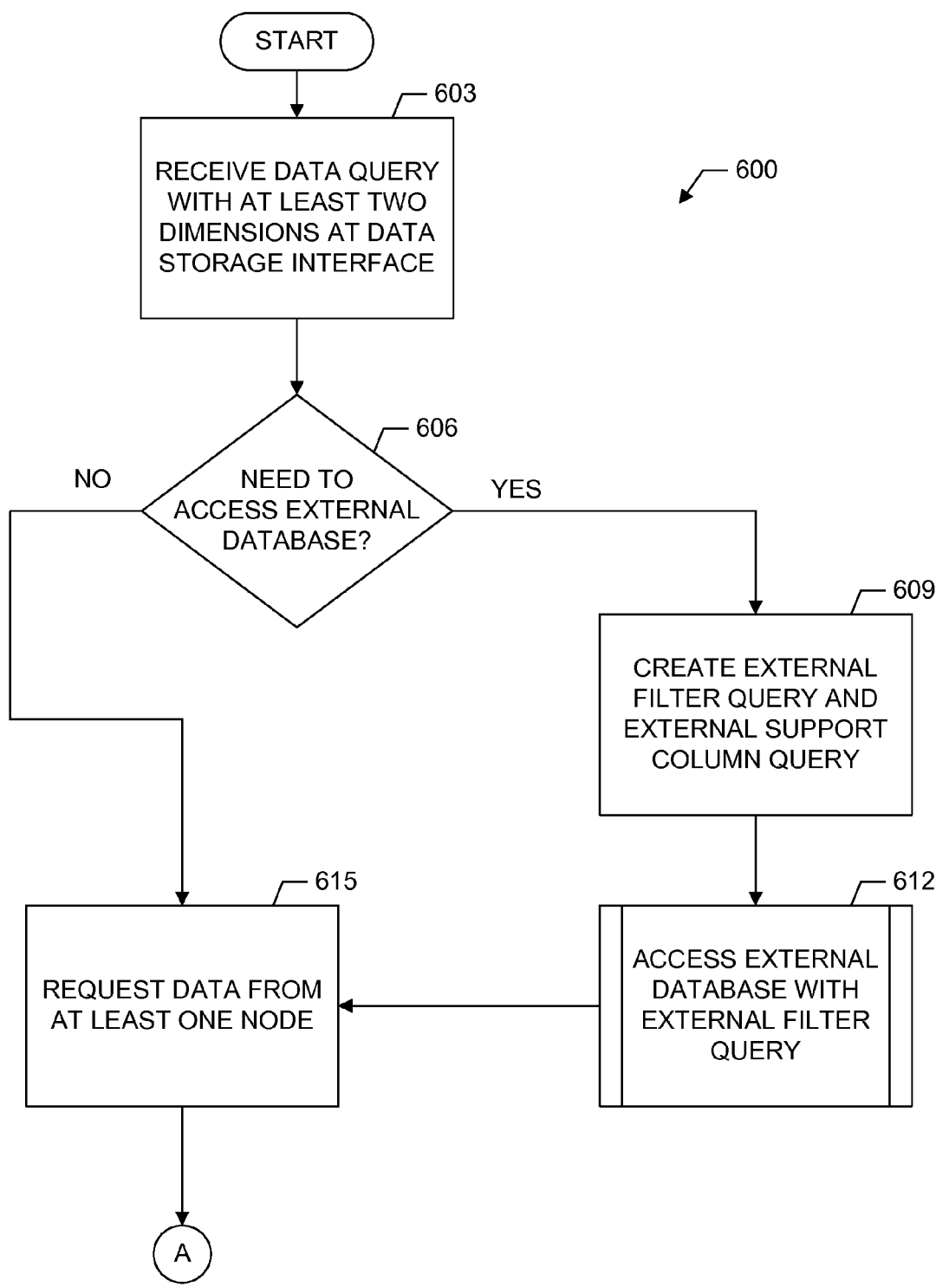
FIGS. 6A-6B, collectively known as FIG. 6, display a logic flow diagram representing a method of querying data in a linear grid management system in accordance with some embodiments of the present invention.
Figure 6B:
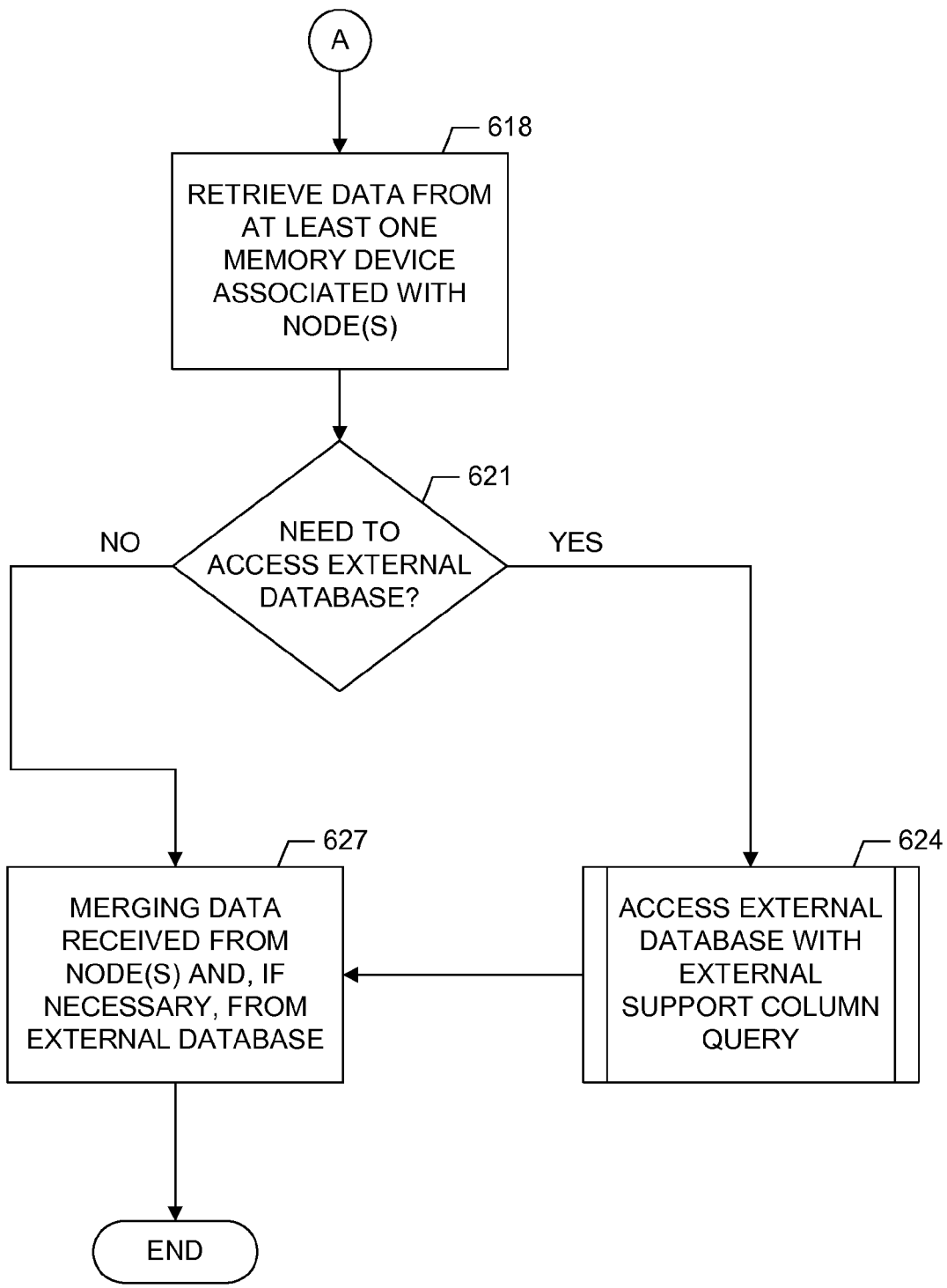

FIGS. 6A-6B, collectively known as FIG. 6, display a logic flow diagram representing a method 600 of querying data in a linear grid management system 100 in accordance with some embodiments of the present invention. Once data has been stored within the database of the linear grid management system 100, data queries may be received from an external source or generated locally. A data request within the linear grid management system 100 may be accomplished efficiently, because the conditions of the data request relate to the dimensions (e.g., two or three selected dimensions) of the data, which is associated with physical locations within the database. For example and not limitation, a data query requesting data regarding a particular product at a particular store on a particular day results in parsing the data at a particular memory storage device 118 identified by a particular data storage identifier 115 (associated with the particular day) associated with a particular node 112 (associated with the particular store).

The method 600 of querying data in a linear grid management system 100 begins at 603, where the data storage interface 109 receives a data query having conditions relating to at least two dimensions of data. At 606, the data storage interface 109 determines whether there is a need to access an external database 306. The data storage interface 109 makes such a determination by examining the data query to evaluate whether the data query references support tables of an external database 306. If at 606, the data storage interface 109 determines that there is a need to access an external database 306, then the method 600 proceeds to 609 where the data storage interface 109 creates an external filter query and external column query. After the data storage interface 109 provides the external filter query to the preSQL processing unit 124, the preSQL processing unit 124, at 612, accesses the external database 306 by providing the external filter query to the external database 306.

At 615, the dispatcher 130 generates at least one data request from at least one node 112, wherein the data request is related to the provided data query (e.g., the data request represents a subset of the data requested by the provided data query). The dispatcher 130 may directly provide the data request to the node 112, or may provide the data request to the data request unit 309 of the common space memory 303. If the node 112 does not receive the data request directly, then the node request manager 406 may retrieve the data request from the data request unit 309 for processing. Next, at 618, a parsing process 318 generated by the node master 409 retrieves data from memory storage device 118 associated with the node 112. The result set received from the memory storage device 118 is then provided by the node result manager 424 to the retrieved data unit 315 of the common space memory 303.

Next, at 621 the data storage interface 109 determines whether there is a need to access the external database 306. If at 621 the data storage interface 109 determines that there is a need to access the external database 306, then the postSQL processing unit 127 is provided with the external support column query, where, at 624, the postSQL processing unit 127 accesses the external database 306 by providing the external database 306 with the external support column query.

At 627, the data merging unit 133 merges the result sets received from the node 112 (via the retrieved data unit 315) and then, if necessary, merges the result with the result set retrieved from the external database 306 (via the postSQL processing unit 127). Finally, the data storage interface 109 terminates operation in accordance with method 600.

If, however, at 606 the data storage interface 109 determines that there is no need to access an external database 306, then the method 600 proceeds to 615, described above. Additionally, if at 621 the data storage interface 109 determines that there is no need to access the external database 306, then the method proceeds to 627, described above.

Figure 7:
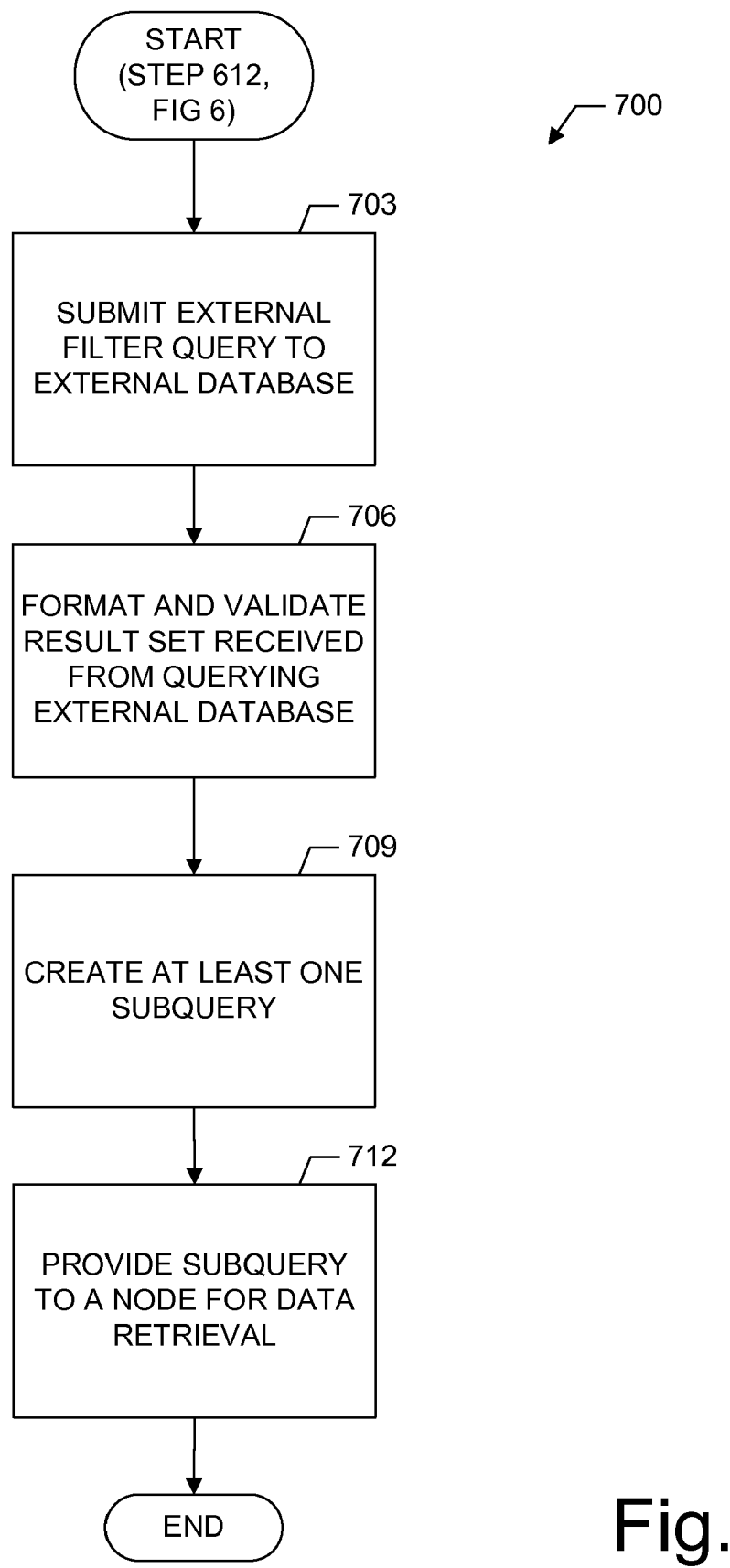
FIG. 7 displays a logic flow diagram representing a method of accessing an external database with an external filter query in accordance with some embodiments of the present invention.

FIG. 7 displays a logic flow diagram representing a method 700 of the routine 612 of FIG. 6A for accessing an external database 306 with an external filter query in accordance with some embodiments of the present invention. As described above with reference to FIG. 6A, the preSQL processing unit 124 accesses the external database 306 with the external filter query.

The method 700 of accessing an external database 306 with an external filter query begins at 703, where the preSQL processing unit 124 submits the external filter query to the external database 306. Next, at 706 the preSQL processing unit 124 formats and validates the result set received from the external database 306 in response to the external filter query. At 709, the preSQL processing unit 124 creates at least one subquery of at least one node 112 from the result set. The subquery is typically related to the result set received from the external database 306. More particularly, the preSQL processing unit 124 utilizes the result set to create a list of matching conditions to be applied to the subquery, thus filtering the subsequent search of items in the linear grid management system 100. At 712, the preSQL processing unit 124 provides the subquery to the node 112 for data retrieval. The subquery may be provided directly to the node 112 by the preSQL processing unit 124, or may be provided indirectly through the data storage interface 109 or by the dispatcher 130. In one embodiment of the present invention, the preSQL processing unit 124 provides the subquery to the dispatcher 130, which provides the subquery as a data request to the data request unit 309 of the common space memory 303. The preSQL processing unit 124 then terminates operation in accordance to method 700.

Figure 8:
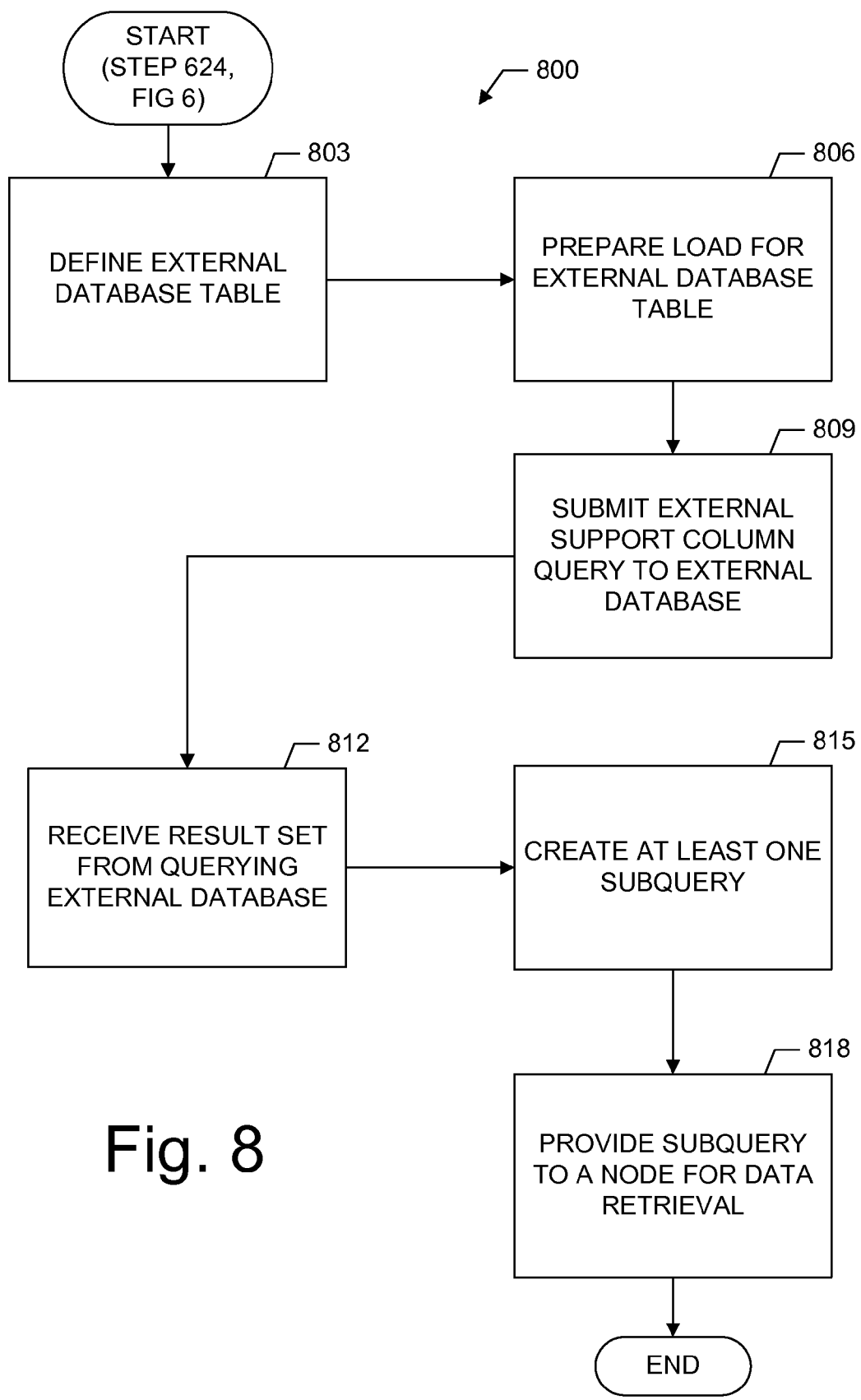
FIG. 8 displays a logic flow diagram representing a method of accessing an external database with an external support column query in accordance with some embodiments of the present invention.

FIG. 8 displays a logic flow diagram representing a method 800 of routine 624 of FIG. 6B for accessing an external database 306 with an external support column query in accordance with some embodiments of the present invention. As described above with reference to FIG. 6B, the postSQL processing unit 127 accesses the external database 306 with the external support column query.

The method 800 of accessing an external database 306 with an external support column query begins at 803, where the postSQL processing unit 127 defines a temporary external database table. At 806, the external database table is then prepared for a load, in anticipation of the result set to be received from the external database 306. Then, at 809, the postSQL processing unit 127 provides the external support column query to the external database 306 for processing. At 812 the postSQL processing unit 127 receives a result set from the external database 306 after processing the external support column query. In another embodiment of the present invention, the result set received by the external database 306 may be stored in a remote table residing with the external database 306. Data may then be retrieved by the linear grid management system 100 when necessary for processing.

Next, at 815 the postSQL processing unit 127 generates a subquery for a node 112, where the subquery relates to the support column information provided in the result set. At 818 the postSQL processing unit 127 provides the subquery to the at least one node 112 for data retrieval. The subquery may be provided directly to the node 112 by the postSQL processing unit 127 or may be provided indirectly through either the data storage interface 109 or by the dispatcher 130. In one embodiment of the present invention, the postSQL processing unit 127 provides the subquery to the dispatcher 130, which then provides the subquery as a data request to the data request unit 309 of the common space memory 303. The postSQL processing unit 127 then terminates operation in accordance to method 800.

Figure 9:
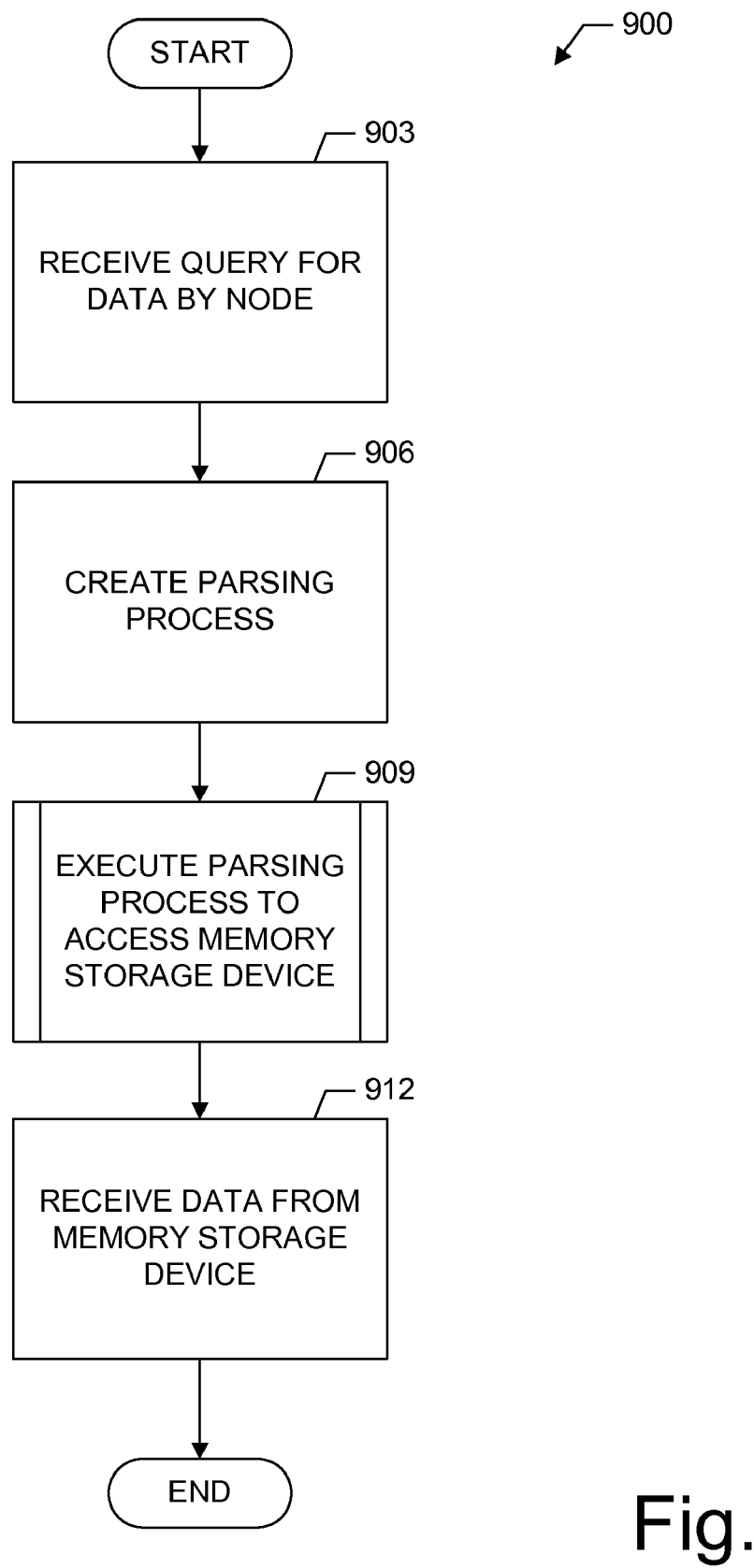
FIG. 9 displays a logic flow diagram representing a method of creating a parsing process by a node in a linear grid management system in accordance with some embodiments of the present invention.

FIG. 9 displays a logic flow diagram representing a method 900 of creating a parsing process 318 by a node 112 in a linear grid management system 100 in accordance with some embodiments of the present invention. Once a node 112 receives a data request or query, the node 112 generates a parsing process 318 to efficiently parse the appropriate data related to the received data request. Accordingly, the nodes 112 of the linear grid management system 100 may generate and execute independent parsing processes 318 simultaneously, thus providing effective and efficient parsing of data within the database.

The method 900 of creating a parsing process 318 by a node 112 in a linear grid management system 100 begins at 903, where the node 112 receives a data request/query. The node 112 may receive the data request directly from the dispatcher 130 or the data storage interface 109, or may indirectly receive the data request from the data request unit 309 of the common space memory 303. In the latter case, the node request manager 406 monitors the data request unit 309 for new data requests. When the node request manager 406 receives or retrieves a new data request, it forwards the data request to the node master 409. At 906, the node 112, through the node master 409, creates an individual, efficient parsing process 318 to be used to retrieve data from the memory storage devices 118 associated with the node 112. Next at 909, the node master 409 initiates the execution of the parsing process 318. At described above, the node master 409 may first schedule the execution of the parsing process 318 with the work control unit 415, which notifies the node master 409 when execution of the parsing process 318 may begin. Upon receiving the notification from the work control unit 415, the node master 409 may provide an XML request to the XML request unit 418 which initiates the parsing process 318. At 912, the node 112 receives the result set (e.g., data) from the memory storage devices 118. The node 112 may receive the result set from the parsing process 318 from the node result manager 424, which provides the result set to the retrieved data unit 315 of the common space memory 303. Finally, the node 112 terminates operation in accordance to method 900.

Figure 10:
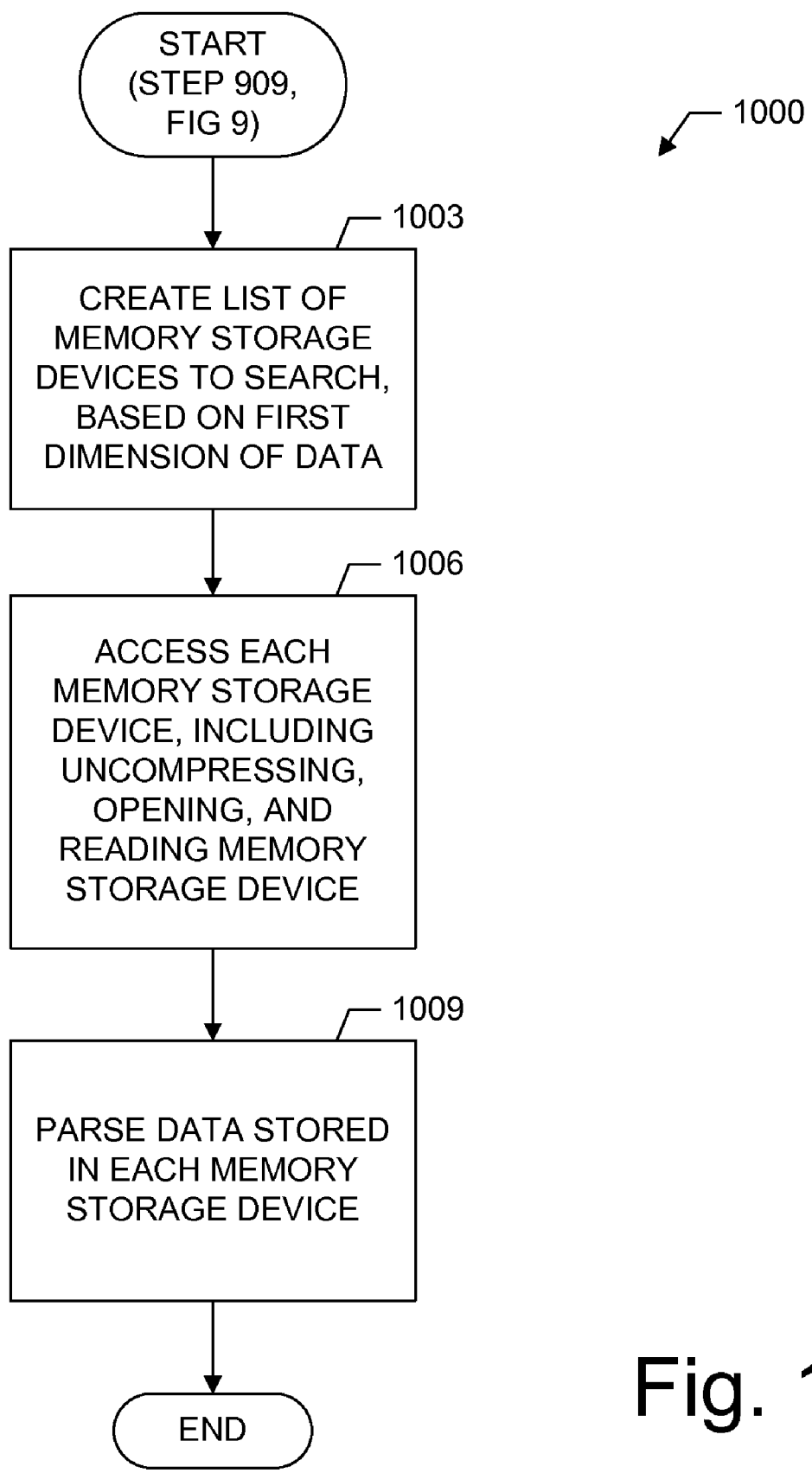
FIG. 10 displays a logic flow diagram representing a method of executing a parsing process by a node in a linear grid management system in accordance with some embodiments of the present invention.

FIG. 10 displays a logic flow diagram representing a method 1000 of routine 909 of FIG. 9 for executing a parsing process 318 by a node 112 in a linear grid management system 100 in accordance with some embodiments of the present invention. Described above with reference to FIG. 9, the node 112 executes the parsing process 318 to access the memory storage devices 118.

The method 1000 of executing a parsing process 318 by a node 112 in a linear grid management system 100 begins at 1003, where the node master 409 creates a list of memory storage devices 118 appropriate for searching, based on a first dimension (e.g., the "where" dimension) of the data referenced in the received data request. Next at 1006, the parsing process 318 accesses each memory device 118 to retrieve data, wherein the parsing process 318 decompresses, opens, and reads the data within the listed memory storage units 118. Then at 1009, the parsing process 318 parses the data stored in each listed memory storage unit 118. Lastly, the node master 409 terminates operation in accordance to method 1000.

Figure 11:
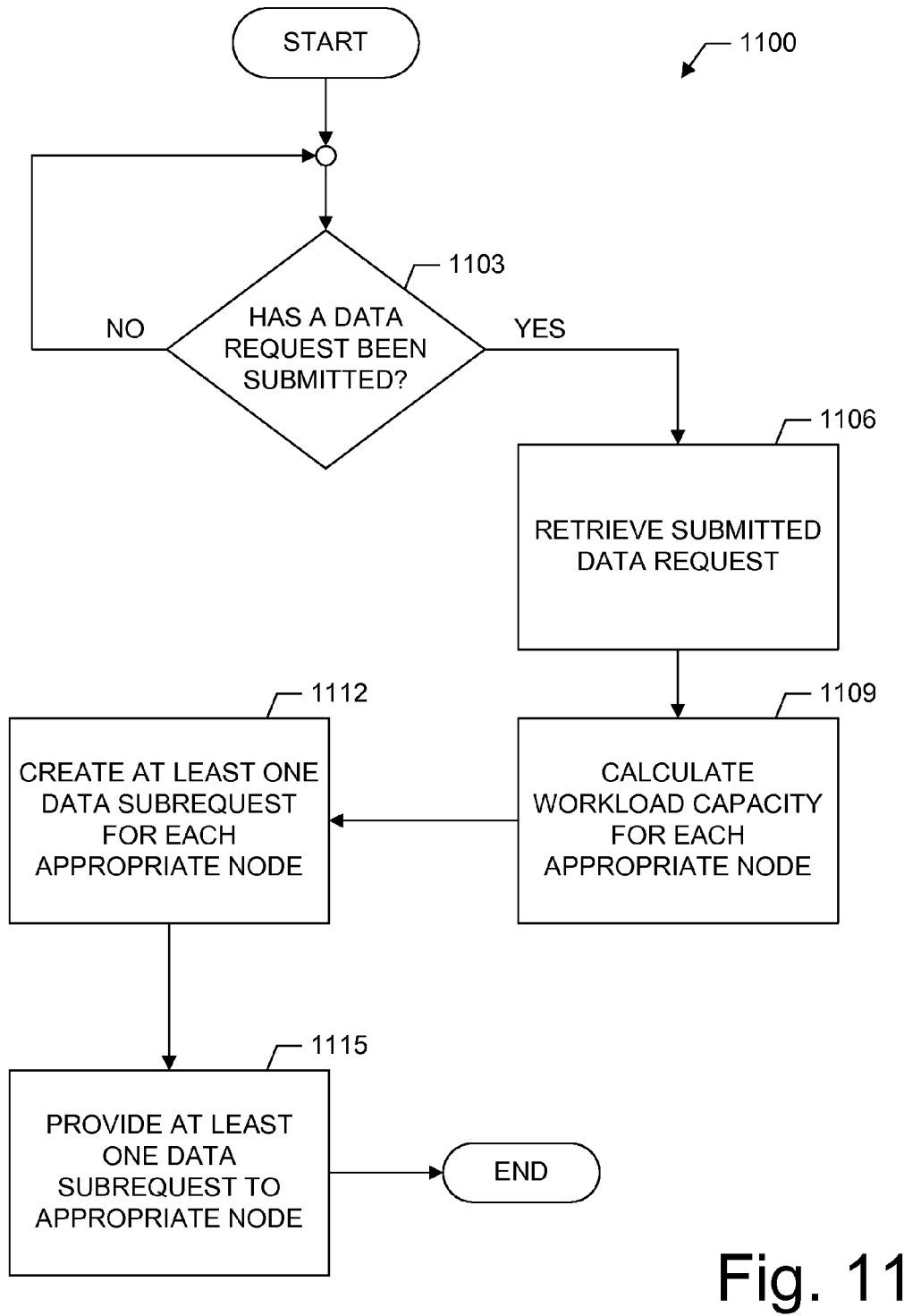
FIG. 11 displays a logic flow diagram representing a method of dispatching a data query to a node in a linear grid management system in accordance with some embodiments of the present invention.

FIG. 11 displays a logic flow diagram representing a method 1100 of dispatching a data query to a node 112 in a linear grid management system 100 in accordance with some embodiments of the present invention. As described above, the dispatcher 130 may coordinate data requests to each node 112 of the linear grid management system 100, wherein all of the data requests to the nodes 112 represent (when merged together) the originally submitted data query (although accessing an external database 306 may also be necessary).

The method 1100 of dispatching a data query to a node 112 in a linear grid management system 100 begins at 1103, where the dispatcher 130 determines whether a data request has been submitted. The dispatcher 130 may determine whether the data request has been submitted by directly communicating with the data storage interface 109 or by indirectly accessing the data request unit 309 of the common space memory 303. If the dispatcher 130 determines that no data request has been submitted, then the dispatcher 130 repeats the determination 1103, as described above. Otherwise, if at 1103 the dispatcher 130 determines that a data request has been submitted, then method 1100 proceeds to 1106 where the dispatcher 130 retrieves the submitted data request. Again, the data request may be received or retrieved from the data storage interface 109 or from the data request unit 309 of the common space memory 303. Next, at 1109 the dispatcher 130 calculates the workload capacity for each appropriate node 112. One skilled in the art will recognize that such a calculation may be made by determining how many processes are being executed at each node 112 and comparing the number to a predetermined maximum. Then, at 1112 the dispatcher 130 creates a data subrequest of data for each appropriate node 112. At 1115 the dispatcher 130 provides the subrequest to the appropriate node(s) 112, where the dispatcher 130 may provide the subrequest directly to the node 112 or may provide the subrequest to a data request unit 309 of the common space memory 303. Finally, the dispatcher 130 terminates operation in accordance to method 1100.

Figure 12:
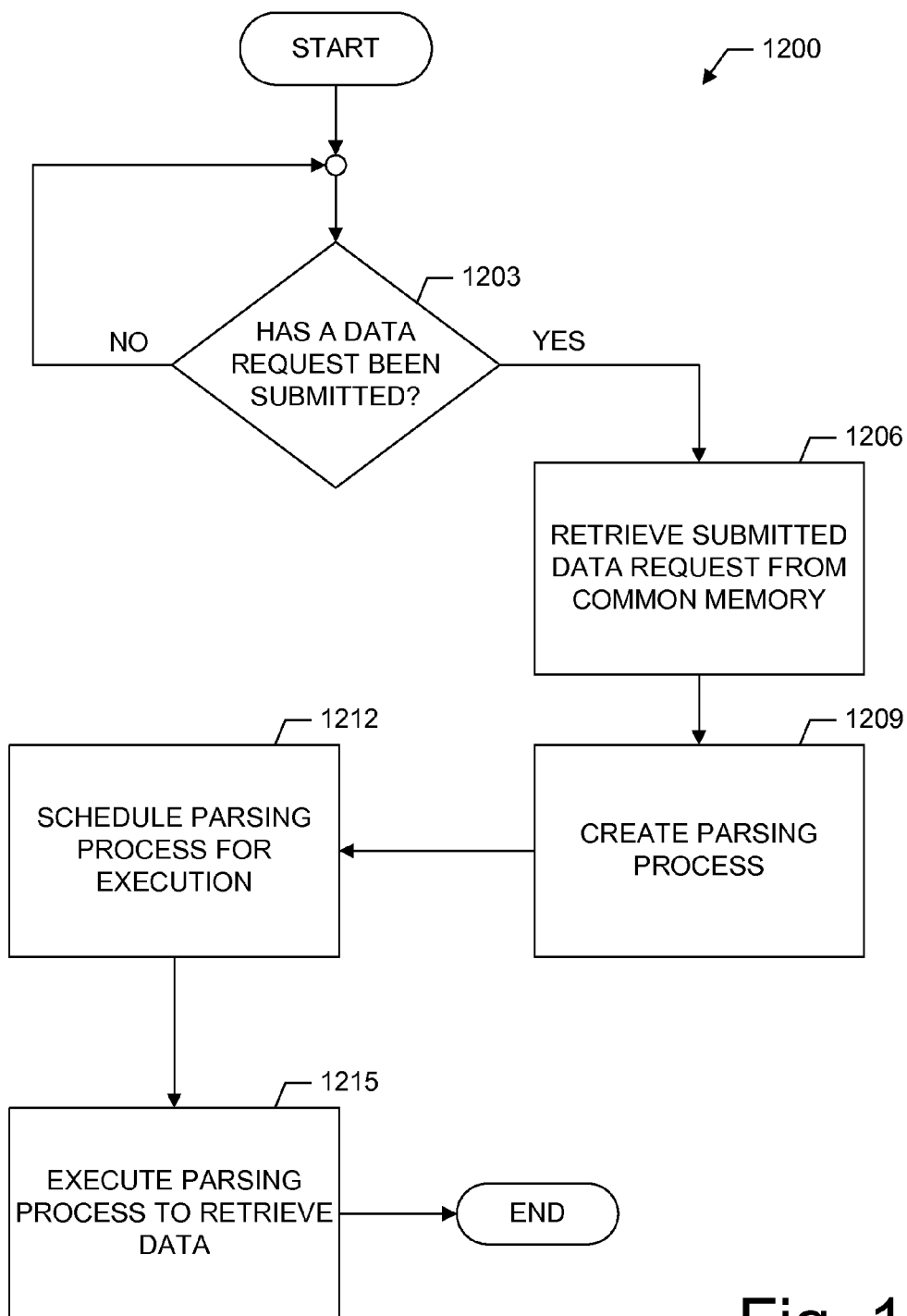
FIG. 12 displays a logic flow diagram representing a method of processing a data request by a node in a linear grid management system in accordance with some embodiments of the present invention.

FIG. 12 displays a logic flow diagram representing a method 1200 of processing a data request by a node 112 in a linear grid management system 100 in accordance with some embodiments of the present invention. Each node 112 may regulate its own workload and, therefore, may determine when to process a data request provided by the dispatcher 130. Accordingly, multiple nodes 112 may be processing data requests simultaneously.

The method 1200 of processing a data request by a node 112 in a linear grid management system 100 begins at 1203, where the node request manager 406 determines whether a data request has been submitted. The node request manager 406 makes this determination when provided a data request from the dispatcher 130 or by polling the data request unit 309 for new data requests. If the node request manager 406 determines that no new data requests have been submitted, then the node request manager 406 proceeds to make the same determination 1203. If, however, at 1203 the node request manager 406 determines that a new data request has been submitted, then, at 1206, node request manager 406 retrieves the submitted data request from the data request unit 309 in the common space memory 303. The node request manager 406 may then log the receipt of the new data request with the node log unit 412 and provide the new data request to the master node 409.

Next, at 1209 the master node 409 creates an efficient parsing process 318 related to the received data request. Then, at 1212 the master node 409 schedules the parsing process 318 for execution with the work control unit 415. The work control unit 415 notifies the master node 409 when the parsing process 318 may be executed. At 1215 the master node 409 executes the parsing process 318 by providing an XML request to the XML request unit 418. The XML request unit 418 processes the request to initiate the execution of the parsing process 318. Upon execution of the parsing process 318, the parsing process 318 provides the node log unit 412 with log data indicating that the parsing process 318 has completed. Upon completion, the parsing process 318 provides the generated result set to the node result manager 424. Finally, the parsing process 318 then terminates in accordance with method 1200.

Whereas the present invention has been described in detail it is understood that variations and modifications can be effected within the spirit and scope of the invention, as described herein before and as defined in the appended claims. The corresponding structures, materials, acts, and equivalents of all mean-plus-function elements, if any, in the claims below are intended to include any structure, material, or acts for performing the functions in combination with other claimed elements as specifically claimed.

What is claimed is:

1. A system for querying organized data comprising:
one or more nodes configured to execute one or more processes, wherein the one or more nodes includes a first node uniquely identified by a first value and a second node uniquely identified by a second value;
a plurality of memory storage locations, each in communication with both the first node and the second node, wherein the first node and the second node are configured to retrieve data from the plurality of memory storage locations;
a data query interface adapted to receive a first data query and to divide the first data query into a first subquery and a second subquery, wherein the first subquery references the first value in a first dimension of data, and wherein the second subquery references the second value in the first dimension of data;
a pre-processing unit adapted to create an external filter query for accessing an external database;
a post-processing unit adapted to create an external support column query for accessing the external database; and
a dispatcher adapted to direct the first subquery to the first node based on the first value being in the first dimension of data of the first subquery, and further adapted to direct the second subquery to the second node based on the second value being in the first dimension of data of the second subquery.

2. The system of claim 1, wherein the pre-processing unit is further adapted to:
submit the external filter query to the external database;
format a result set received from the external database;
validate the result set;
create at least one subquery for the first node, wherein the at least one subquery is related to the result set; and
provide the at least one subquery to the first node.

3. The system of claim 1, wherein the post-processing unit is further adapted to:
define an external database table;
prepare a load of data for the external database table;
submit the external support column query to the external database;
receive a result set from the external database, wherein the result set is loaded into the external database table;
create at least one subquery for the first node, wherein the at least one subquery is related to the result set; and
provide the at least one subquery to the first node.

4. The system of claim 1, the first node and the second node each being further configured to create dynamically a parsing process to request data from the plurality of memory storage locations.

5. The system of claim 4, the first node being further configured to execute the parsing process to access the one or more memory storage locations, and receive data from the plurality of memory storage locations.

6. The system of claim 4, the first node being further configured to:
create a list of memory storage locations to search based on the second dimension of the second subquery; and
access each memory storage location in the list of memory storage locations, wherein accessing each memory storage location includes uncompressing, opening, and reading the data of the memory storage location.

7. The system of claim 1, wherein each of the plurality of memory storage locations is uniquely identified by at least one data storage identifier related to the second dimension of the first subquery.

8. The system of claim 1, further comprising a data merging unit configured to aggregate received data received from the one or more memory storage locations and the external database, and remove duplicative data within the received data.

9. The system of claim 1, the first node configured to parse the first subquery and, based on the first subquery, to retrieve data from the plurality of memory storage locations.

10. The system of claim 1, further comprising a merging unit configured to construct at least a portion of a response to the first data query by merging data received from the first node and the second node in response to the first and second subqueries.

11. The system of claim 5, the first node comprising hardware to execute the parsing process.

* * * * *